United States Patent [19]

Nelson

[11] 4,192,191
[45] Mar. 11, 1980

[54] PRESSURE SENSOR
[75] Inventor: Robert L. Nelson, Austin, Tex.
[73] Assignee: Tracor, Inc., Austin, Tex.
[21] Appl. No.: 959,314
[22] Filed: Nov. 9, 1978
[51] Int. Cl.² .............................................. G01L 7/00
[52] U.S. Cl. ...................................... 73/701; 73/722; 73/728
[58] Field of Search ...................... 73/701, 728, 517 B, 73/722, 717, 723

[56] References Cited
U.S. PATENT DOCUMENTS

| 3,908,460 | 9/1975 | Lichowsky | 73/701 |
| 4,077,262 | 3/1978 | Cholet | 73/722 |

Primary Examiner—Donald O. Woodiel
Attorney, Agent, or Firm—Frank S. Vaden, III

[57] ABSTRACT

A mechanical and electrical pressure sensor wherein the mechanical part includes a fluid pressure chamber with a magnetic, electrically conductive diaphragm moving out-of-contact with a stationary contact in the presence of pressure and into contact therewith in the absence of pressure or because of energizing of a cooperatively acting magnetic coil. The electrical circuit connected to the coil includes a clocked flip-flop, the output of which is high during a time interval when the contacts are open (coil energized) and which is low when the contacts are closed (coil deenergized). The duty cycle of energized time to total time is a measure of average coil winding current, and, hence, sensed pressure. The ratio of energized intervals to total intervals develops a useful digital measurement of pressure readily useful in a computer.

12 Claims, 1 Drawing Figure

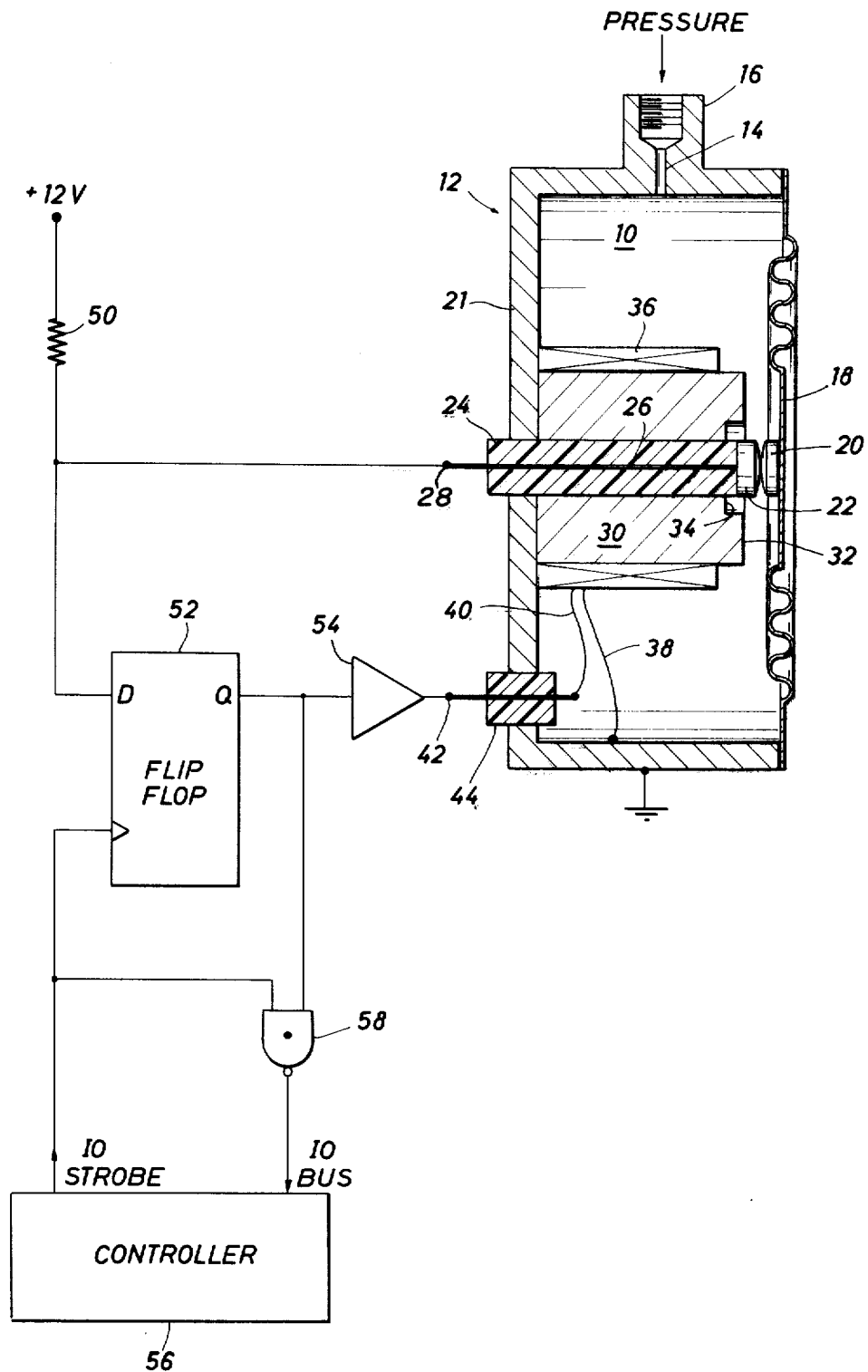

PRESSURE SENSOR

BACKGROUND OF THE INVENTION

1. Field of the Invention

This invention relates to a fluid pressure sensing and of establishing an electrical measure thereof.

2. Description of the Prior Art

Fluid pressure sensing refers to both gas and liquid pressure sensing.

Fluid pressure sensors in the prior art have typically relied on the amount of displacement of one part with respect to another caused by a sampling of the applied fluid. For example, fluid under pressure is applied to a chamber having a diaphragm as one of its walls, the external side of the wall being at ambient pressure condition. The diaphragm typically has attached to it a wiper connection of a potentiometer. Movement of the diaphragm, and hence the wiper carried thereby, changes the electrical resistance characteristics of a network including the potentiometer. This change can be reflected in a voltage change, which, in turn, drives a meter. Alternatively, the analog voltage can be converted to digital format for processing in a digital controller or the like.

Alternative to the diaphragm carrying a movable element of a resistor, diaphragms employed in the prior art have carried one plate of a capacitor. Movement of the diaphragm moves this plate closer to or further from a stationary capacitor plate, resulting in the change of capacitance. This capacitance change can be metered or used in a manner similar to the resistance change discussed above.

Also, magnetic response of an electromagnet caused by movement of a movable core carried by a diaphragm operating in a coil has also been used in prior art pressure sensors.

The movement of the diaphragm is not linear with pressure change, since as the outward distance from an at-rest starting point grows, the stiffer the diaphragm becomes. Moreover, the entire diaphragm does not normally move outwardly uniformly since it is stationarily connected at its periphery, further defeating linearity of response. Such non-linearity is either disregarded or compensated for in prior art sensors using movable resistance, capacitance or magnetic elements.

It is also evident that each of the components discussed above carried by prior art pressure sensing dipahragms are somewhat bulky, thereby slowing down the response to pressure changes due to inertia and even affecting the response sensitivity of the sensor.

One type of electrical circuit that is often used in conjunction with one of the mechanical sensing arrangements described above includes a tuned circuit. The movable elements connected to the diaphragm varies the frequency of the output. In order to use this frequency change in a meter of common utilization systems, it is necessary to have a frequency-to-voltage converter and, in some cases, an additional analog-to-digital voltage converter operation in conjunction with a computer.

Therefore, it is a feature of the present invention to provide an improved fluid pressure sensor in which the measurement of pressure is independent of the amount of or linearity of diaphragm movement.

It is another feature of the present invention to provide an improved fluid pressure sensor which develops a digital-type output signal for metering or use purposes without going through a conversion either from a frequency change or an analog voltage change.

It is still another feature of the present invention to provide an improved fluid pressure sensor which uses a stiff diaphragm of minimum bulk carrying only an electrical contact and no other electrical or magnetic parts, thereby providing ruggedness and fast response, and eliminating requirements for diaphragm, electrical and magnetic linearity.

SUMMARY OF THE INVENTION

The pressure sensor and measuring apparatus includes a chamber having a flexible, but stiff, electrically conductive diaphragm made of magnetic material and including a contact carried thereon. Inside the chamber, a magnetic coil winding is placed to attract the diaphragm contact back to an at-rest position against a stationary contact whenever sensed pressure causes the contacts to open.

The input to a D-type flip-flop is connected to a low voltage or ground connection via the diaphragm and stationary contacts. The output from the flip-flop is connected through a saturating buffer amplifier to the coil winding. When the contacts are closed the coil is deenergized. Opening of the contacts due to internal fluid pressure in the chamber applies a high voltage (logic one) to the flip-flop.

The flip-flop is polled at regular intervals at a high frequency rate by a strobe or clock pulse. When the contacts are closed, there is a low (logic zero) output from the flip-flop. This is detected by a controller, or similar use device or circuits. When the output is high (logic one), the coil winding is energized to close the contacts. This output is also detected by the use device or circuit.

The energization, whenever it occurs, is only applied during a fraction of the time intervals between clock pulses. The deenergization occurs for the remainder of the time. The duty cycle of energization time to total time is a measure of the sensed pressure.

DESCRIPTION OF THE DRAWING

So that the manner in which the above-recited features, advantages and objects of the invention, as well as others which will become apparent, are attained and can be understood in detail, more particular description of the invention briefly summarized above may be had by reference to the embodiment thereof which is illustrated in the drawing, which drawing forms a part of this specification. It is to be noted, however, that the appended drawing illustrates only a typical embodiment of the invention and is therefore not to be considered limiting of its scope, for the invention may admit to other equally effective embodiments.

In the drawing:

The FIGURE is a composite illustration showing a partial cross-section of the mechanical components of the preferred embodiment of the present invention and a simplified block diagram of the electrical components thereof.

DESCRIPTION OF THE PREFERRED EMBODIMENT

Now referring to the drawing, a preferred embodiment of a pressure sensor in accordance with the present invention is illustrated. A cylinder or chamber 10 is housed in a steel metallic body 12 having a small aperture 14 through which fluid pressure to be sensed and measured is applied. For convenience, body 12 is formed into a nozzle 16 surrounding aperture 14 for accepting a hose connection to apply the gas under pressure. The external surface of nozzle 16 may additionally be grooved or otherwise treated to form a secure fit for and to prevent inadvertent or accidental removal of the hose.

One side wall of chamber 10 is formed of flexible, magnetic steel material to create diaphragm 18, or some other suitable magnetic and electrically conductive material. A contact 20, which may be centrally located on the diaphragm, projects inwardly for making contact with a stationary contact 22. Stationary contact 22 is supported in the opposite wall 21 of body 12 by resilient insulator post 24. Typically, such a post is made of nylon. A lead 26 through the post connects contact 22 to terminal 28 external of the chamber.

A magnetic core 30 surrounds insulator post 24 and presents a pole piece having end 32 located adjacent to and spaced apart from diaphragm 18. The pole piece surrounds contact 22 and includes a recess 34 in end 32 to insure against accidental contact of the pole piece with the contact.

Surrounding magnetic core 30 is a coil winding 36 having one lead end 38 therefrom attached to body 12, such as by welding. The other end 40 of winding 36 is attached to terminal 42, through insulator 44 located in the wall 21 of body 12.

A logic circuit is connected to electrical contacts 28 and 42 of the chamber just described. Resistor 50 has a +12-volt dc voltage applied thereto and is connected to the D input of D-type flip-flop 52. The Q output of flip-flop 52 is connected to saturating buffer amplifier 54 which, in turn, has its output connected to terminal 42.

A D-type flip-flop operates in such a way that the input on terminal D thereof is reflected in the output on terminal Q each time there is a clock input thereto. If there is a high (logic one) input, then there is a high (logic one) output. If there is a low (logic zero) input, then there is a low (logic zero) output.

The strobe input to flip-flop 52 is a clock pulse, identified as "IO Strobe" in the drawing, from a controller network 56. The clock pulse from the controller network polls the flip-flop, resulting in an output from the flip-flop corresponding to the input applied to the D terminal thereof at each strobe occurrence. Clock or strobe pulses occur at regular discrete intervals every few microseconds.

The Q output from the flip-flop is applied to gate 58, the other input of which is the IO Strobe input applied to the flip-flop. The output from the gate is identified as the "IO Bus" output in the drawing, which is applied to controller 56.

In operation, prior to a pressure sampling being applied to the input to the chamber, diaphragm 18 is at rest, bringing contact 20 barely into contact with stationary contact 22. Insulation post 24 is resilient to minimize contributing a force at the contacts to the diaphragm. The presence of a pressure differential between the outside and internal pressure condition of the chamber, results in a displacement or separation of diaphragm contact 20 from stationary contact 22. This breaks or opens an electrical connection from resistor 50 through terminal 28, the two contacts, the electrically conductive metallic diaphragm and body 12, which is considered to be or is actually the ground. Hence the +12-volt connection applied to resistor 50 is applied at the D input to flip-flop 52. The next time a clock pulse or IO Strobe input is applied to the flip-flop, this +12-volt input (logic one) results in a high output from the flip-flop on terminal Q. Hence, amplifier 54 produces an output current to terminal 42 which is sufficiently large to cause coil 36 to become energized. Energization of coil 36 produces a magnetic flux through the core end for attracting the metallic diaphragm, which, in turn, results in the eventual closing of contacts 20 and 22, whereupon an electrical connection to ground is completed through the contacts so that there is a zero voltage input (logic one) applied to the flip-flop. Hence, a subsequent pulse input to the flip-flop results in a low voltage output therefrom. Hence, there is no energization of the coil from amplifier 54.

The contacts stay closed during subsequent pulsing until the pressure differential again causes displacement of diaphragm contact 20 from stationary contact 22. When this occurs, the same sequence results as previously described. In summary, the coil winding is energized and deenergized in discrete time intervals.

The logic information from flip-flop 52 is sampled and applied to gate 58, shown in the drawing as a NAND gate. Each time there is a clock pulse produced to the gate, the output therefrom is either the high voltage logic signal or the low voltage logic signal as determined by the Q output of the flip-flop.

The ratio of the total open time interval compared with the total time of the closed time interval plus the total open time interval is referred to as the "duty cycle", which becomes an effective measurement of the fluid pressure applied to the chamber. The controller, normally in the form of a computer, includes an appropriate means for either using the duty cycle measurement or for visually displaying such measurement in the terms of the pressure sensed, or both. Devices and circuits utilizing such a measurement are well known in the art.

The sampling of the output of the flip-flop over a period of time gives an effective measurement of the average voltage output from the flip-flop, which is an effective measurement of the average current applied to coil 36 for causing contact closure whenever there is a contact displacement. Average coil winding current is a measure of the pressure sensed.

It is to be noted that linearity of the diaphragm is not important in the operation. Further, the output from the logic circuit is either the high voltage output from the flip-flop or the low voltage output therefrom, the flip-flop output not being a variable analog type voltage, but rather a rectangular wave voltage, lending itself to ready digital treatment.

It should be further noted that the diaphragm never has a chance to move far from the at-rest or neutral position because as soon as it does, the contacts open, resulting in coil energization and contact closing. Thus, the stiffness and linearity of the diaphragm are not factors in the resulting output. The slight movement of the diaphragm also enhances the responsiveness of the sensor. The controller normally includes a digital low pass filter for energizing the digital high and low conditions from the flip-flop. The fastest response is obtained when such a filter has a time constant which is close to the time constant of the coil winding circuit.

While a particular embodiment of the invention has been shown and described, it will be understood that the invention is not limited thereto, since modifications may be made, and will become apparent to those skilled in the art.

For example, photoelectric or other means, rather than contacts, could be used to detect the displacement of the diaphragm and energize the coil.

The flip-flop also could be eliminated in the electronic portion of the circuit by employing direct energization of the coil. Such a circuit would use, for example, an analog low-pass filter connected to the output of the flip-flop for providing an analog output. Of course, such a circuit would not directly provide digitization of the output, as with the illustrated embodiment.

The pressure to be measured may also be less than ambient (a vacuum). In such case, the coil and stationary contact arrangement would be located external to the chamber, rather than internal, as illustrated. Therefore, it is understood that, in such cases, chamber "pressure" includes vacuum pressure as well as a pressure greater than ambient. Furthermore, since the sensor operates to measure a pressure differential between the inside an outside pressures, there is no reason why the outside is required only to be exposed to ambient pressure. A large chamber could house all of chamber 10 to present a base pressure with respect to which the internal pressure is sensed and measured. Other modifications could include the shape of the diaphragm and the location of the contacts.

What is claimed is:

1. Apparatus for sensing a fluid pressure and measuring the pressure sensed, comprising
    a chamber having an input opening through which the fluid pressure to be sensed is applied,
        said chamber having a flexible wall diaphragm including means for sensing its displacement from a rest position, and
    means for applying a force to said diaphragm to return it to the rest position when chamber pressure causes displacement of said diaphragm and removing said force when said diaphragm returns to the rest position, application of said force compared with the time of application of said force plus the time interval between applications being a measure of the pressure sensed.

2. Apparatus for sensing a fluid pressure and measuring the pressure sensed in accordance with claim 1, wherein said means for sensing displacement of said diaphragm includes mating electrical contacts.

3. Apparatus for sensing a fluid pressure and measuring the pressure sensed in accordance with claim 1, wherein said force applying means includes a coil.

4. Apparatus for sensing a fluid pressure and measuring the pressure sensed in accordance with claim 1, wherein said force applying means includes a coil, and wherein said sensing means energizes said coil to return said diaphragm to its rest position when chamber pressure causes its movement from its at rest position and deenergizes said coil when it returns to its at rest position.

5. Apparatus for sensing a fluid pressure and producing a digital logic signal, the duty cycle of which is a measure of the pressure sensed, comprising
    a chamber having an input opening through which the fluid pressure to be sensed is applied, said chamber having a flexible wall diaphragm including an electrical contact,
    a coil having a stationary contact against which said diaphragm contact moves when said diaphragm is at rest and when said coil is energized, chamber pressure causing displacement of said contacts,
    logic means connected to said stationary contact and to the winding of said coil, and
    lock means connected to said logic means for causing said logic means to sample the existence of contact between said diaphragm and stationary contact at regular intervals, the presence of electrical contact between said diaphragm and stationary contacts producing a first logic signal output from said logic means, a displacement of said contacts resulting from internal chamber pressure producing a second logic signal output from said logic means for energizing said coil winding and causing closing of said contacts, the ratio of first logic signal output to total output resulting in a variable duty cycle measurement of sensed pressure.

6. Apparatus for sensing and measuring fluid pressure in accordance with claim 5, wherein said wall diaphragm is electrically conductive and is grounded to the body of said chamber.

7. Apparatus for sensing and measuring fluid pressure in accordance with claim 5, wherein one of the ends of said coil winding is grounded to the body of said chamber.

8. Apparatus for sensing and measuring fluid pressure in accordance with claim 5, wherein
    said wall diaphragm is electrically conductive,
    said stationary contact is fixedly positioned internal to said chamber, and
    said coil winding is fixedly positioned internal to said chamber and insulated from said stationary contact.

9. Apparatus for sensing and measuring fluid pressure in accordance with claim 5, wherein said logic means includes
    a D-type flip-flop connected to said second logic voltage when said diaphragm and stationary contacts are displaced and to a first logic voltage through said contacts when said contacts are closed.

10. Apparatus for sensing and measuring fluid pressure in accordance with claim 9, and including a saturating buffer output receiving the output from said flip-flop and applying an energizing current to said coil winding.

11. Apparatus for sensing and measuring fluid pressure in accordance with claim 9, and including averaging means connected to the output of said flip-flop for measuring the average duty cycle of the output therefrom.

12. Apparatus for sensing and measuring fluid pressure in accordance with claim 11, wherein said clock means produces a clock pulse and said averaging means includes a digital filter having a gate for receiving the output from said flip-flop and said clock pulse.

* * * * *